United States Patent
Bloch et al.

(10) Patent No.: US 7,986,473 B2
(45) Date of Patent: Jul. 26, 2011

(54) SYSTEM AND METHOD FOR FOCAL LENGTH STABILIZATION USING ACTIVE TEMPERATURE CONTROL

(75) Inventors: Stephanie M. Bloch, Rush, NY (US); Kenneth Sheehan, Ontario, NY (US)

(73) Assignee: Quality Vision International, Inc., Rochester, NY (US)

( * ) Notice: Subject to any disclaimer, the term of this patent is extended or adjusted under 35 U.S.C. 154(b) by 0 days.

(21) Appl. No.: 12/577,643

(22) Filed: Oct. 12, 2009

(65) Prior Publication Data
US 2010/0039714 A1   Feb. 18, 2010

Related U.S. Application Data

(63) Continuation-in-part of application No. 12/185,632, filed on Aug. 4, 2008, now Pat. No. 7,602,563, which is a continuation of application No. 11/633,303, filed on Dec. 4, 2006, now Pat. No. 7,408,728.

(51) Int. Cl.
*G02B 7/02* (2006.01)

(52) U.S. Cl. .......................................... 359/820; 355/30

(58) Field of Classification Search .................. 359/820; 353/100, 101, 122; 355/30, 53, 55, 67, 75; 372/21, 34; 219/121.12, 121.26, 121.75
See application file for complete search history.

(56) References Cited

U.S. PATENT DOCUMENTS

| | | | |
|---|---|---|---|
| 4,427,888 A * | 1/1984 | Galvin | 250/331 |
| 5,389,774 A | 2/1995 | Gelman et al. | |
| 5,690,417 A | 11/1997 | Polidor et al. | |
| 5,883,704 A * | 3/1999 | Nishi et al. | 355/67 |
| 6,292,306 B1 | 9/2001 | Betensky | |
| 7,056,318 B2 * | 6/2006 | Black | 606/9 |
| 7,116,396 B2 * | 10/2006 | Tsuji et al. | 355/30 |
| 7,408,728 B2 | 8/2008 | Bloch et al. | |
| 7,602,563 B2 | 10/2009 | Bloch et al. | |

* cited by examiner

*Primary Examiner* — Loha Ben
(74) *Attorney, Agent, or Firm* — Stephen B. Salai, Esq.; Brian B. Shaw, Esq.; Harter Secrest & Emery LLP

(57) ABSTRACT

An optical metrological system having a heat-generating light source coaxially mounted near a heat-sensitive lens. The system uses a temperature sensor to monitor the lens temperature and a heating element to heat the lens such that the lens operating temperature is greater than a maximum operating temperature of the light source in order to stabilize the focal length of the lens.

17 Claims, 8 Drawing Sheets

SYSTEM AND METHOD FOR FOCAL LENGTH STABILIZATION USING ACTIVE TEMPERATURE CONTROL

CROSS-REFERENCE TO RELATED APPLICATIONS

This application is a continuation-in-part of U.S. patent application Ser. No. 12/185,632, filed Aug. 4, 2008, now U.S. Pat. No. 7,602,563, which is a continuation of U.S. patent application Ser. No. 11/633,303, filed Dec. 4, 2006, now U.S. Pat. No. 7,408,728.

BACKGROUND AND SUMMARY

This invention is related to metrological methods and systems, and more particularly, to methods and systems for focal length stabilization of metrological systems using active temperature control.

Automated metrology systems are used for the optical inspection of an object. Such inspections are performed in order to obtain precise dimensional and other measurements of the object. The object is placed on a stage (with precision movements for X-Y measurements) and the image of the object undergoes computerized image analysis. The Z-axis is also measurable using the auto-focus routine of the software resulting in height measurements of the object. A precise three-dimensional reproduction of the object is obtained using the measurements. The optical assemblies used in such systems are composed of a main imaging path, a calibration system and a surface illumination system for illumination of the object to be inspected.

The main imaging system of an optical system used for metrology, as described, for example, in U.S. Pat. No. 6,292,306, is comprised of a front lens, and either a fixed or zoom system behind, with a camera in the focal plane of the system. The system is designed to have collimated space between the front lens and the zoom or fixed lens portion of the imaging system. Z-axis measurements are taken with auto-focus, a computerized image analysis, to find the best focus of the system. Because of the collimated space behind the front lens, the front focus of the system is ultimately the front focus of the front lens. Any environmental changes to the front lens that may cause the physical front focus to change will add error to the Z-axis measurement of the object.

The calibration system, as described, for example, in U.S. Pat. No. 5,389,774, allows a user to perform calibration and return to a previously saved magnification. This is done by saving a reticle image at a selected magnification, calling up that image when that magnification is desired again, and waiting for the zoom lens to adjust until the present reticle image matches the saved reticle image.

The surface illumination system uses a variety of techniques to illuminate the object to be measured in order to enhance the precision of the measurements. One technique uses an LED ring surface illuminator, as described, for example, in U.S. Pat. No. 5,690,417, that allows for contours, ledges, edges, and other generalized surface height variations to be imaged. In such a system, the light source may surround the front lens of the main imaging system, creating a large amount of heat adjacent to the lens. When heated, the properties of the glass change, thus causing a change in front focal length directly affecting the front working distance/front focus (Z-axis measurement/height) of the system. The problem this creates is inaccurate Z-axis position measurements of the object to be measured. The Z-axis position measurement of the object will change once the light source is turned on, and will continue to change over time, as the light source heats up, until the light source reaches its maximum operating temperature. Any time the light is turned off and the temperature of the optics is allowed to change, the Z-axis position measurement of the object will also change. The fluctuation of lens focal length with temperature also results in repeatability errors as confirmed by repeated measurements of the same object over a period of time. Typically, Z-axis position measurements may fluctuate by 10-20 microns due to a temperature change, depending on the optical system and the amount of heat generated by the light source. An advantage of embodiments is the reduction of Z-axis position measurement variations in an object measured by a metrology system by reducing the temperature fluctuation in a heat-sensitive lens.

Embodiments stabilize the lens temperature of an optical system having a heat-sensitive lens in proximity to a heat generating device such as a light source. Embodiments also insulate the lens from environmental temperature variations that can affect Z-axis position measurements. Embodiments can be used in any application in which a stable lens temperature can optimize system performance. Embodiments provide an advantage in that they enable accurate Z-axis position measurements of objects and ensure that such measurements do not vary over time. Maintaining the lens at a constant temperature can also protect the lens from damage such as de-cementing which is caused by sudden and frequent lens temperature variations.

An optical system with focal length stabilization in accordance with embodiments includes a housing supporting a heat-sensitive lens within the housing, a light source secured to the housing, a heating element connected to the housing to heat the lens, at least one temperature sensor connected to the housing, and a controller in electrical communication with the at least one temperature sensor and the heating element such that the controller monitors a temperature of the lens and adjusts a current in the heating element to maintain the temperature of the lens within a pre-selected range.

A method for stabilizing focal length in a heat-sensitive lens supported in a housing having a light source secured thereto in accordance with embodiments includes the steps of monitoring a lens temperature using at least one temperature sensor connected to the housing, and maintaining the lens temperature within a pre-selected range by controlling a heating element attached to the housing.

DESCRIPTION

Figure 1:
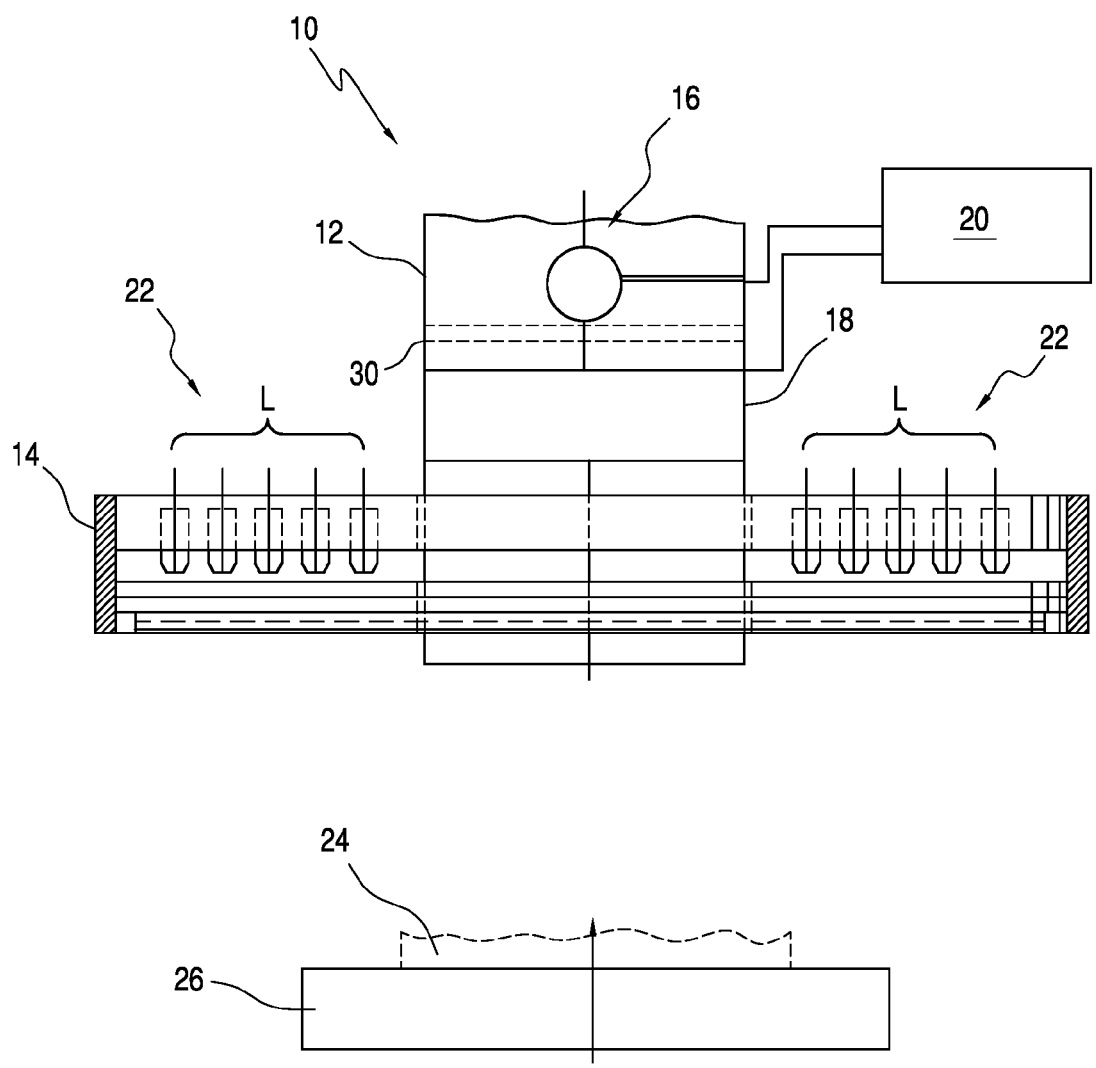
FIG. 1 is a side elevation view of an optical system having a light source coaxially mounted on one end of its objective lens system and using a temperature sensor and heating element for active focal length stabilization in accordance with embodiments.

A system 10 and method for stabilizing focal lengths in a heat sensitive lens in accordance with embodiments is illustrated in FIGS. 1-5. The system 10 includes a cylindrical lens housing 12 containing a conventional objective lens system 30, a lamp supporting housing 14, a temperature sensor 16, a heating element 18, a controller 20, and a light source 22, although the system 10 can comprise other numbers and types of components in other configurations. The method describes strategically heating the housing and maintaining the temperature of a heat-sensitive lens within a pre-selected range in order to stabilize the focal length of the lens. Embodiments provide a number of advantages including the reduction of inaccurate measurements and repeatability errors caused by heat-induced variations in lens focal length.

Figure 2:
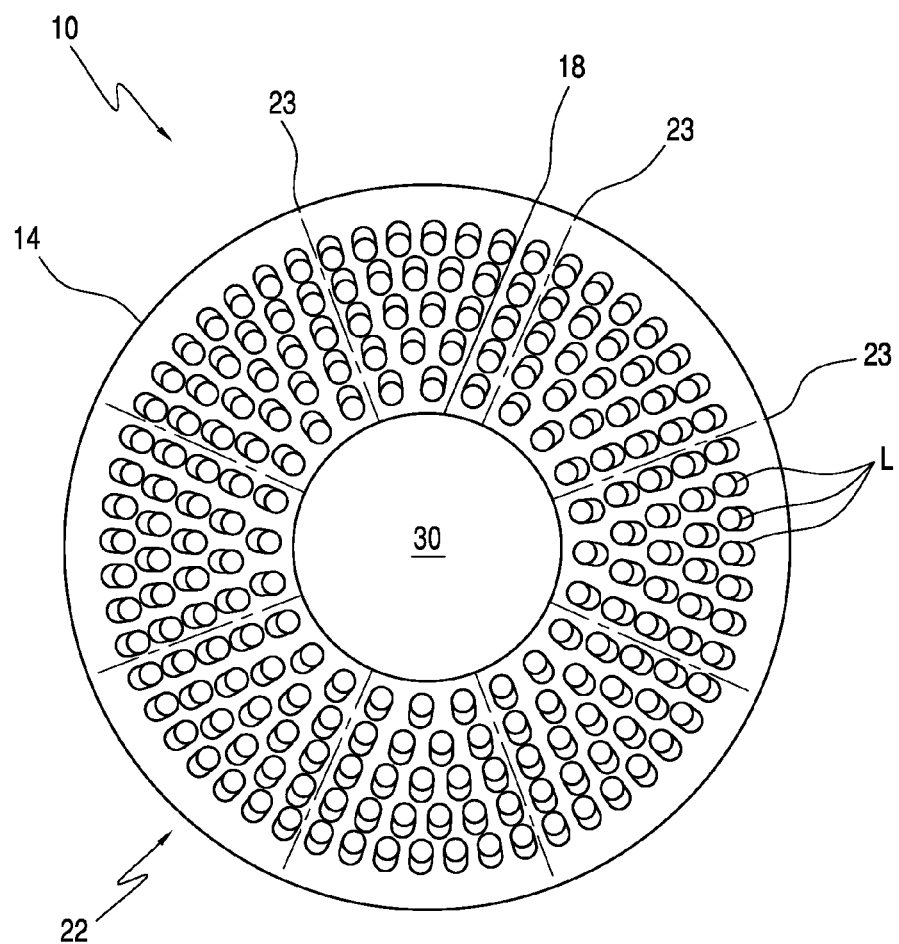
FIG. 2 is a bottom view of an optical system having a light source coaxially mounted on one end of its objective lens system in accordance with embodiments.

Referring to FIGS. 1 and 2, the system 10 includes a cylindrical lens housing 12 containing a conventional objective lens system 30, a disc-shaped lamp supporting housing 14, a temperature sensor 16, a heating element 18, and a controller 20 that adjusts current to the heating element to increase and decrease temperature measured at the temperature sensor. In the exemplary embodiment shown in FIGS. 1 and 2, an annular, generally disc-shaped lamp supporting housing 14 is secured to and surrounds the lower end of the lens housing 12. A light source 22 is mounted in the lamp supporting housing 14. Preferably, the light source comprises a plurality of lamps L, although any suitable type of light source can be used. The lamps L are secured or mounted at their inner ends in the lamp supporting housing 14, and the lamps L project at their outer, light emitting ends downwardly from the housing 14 in the direction of an object 24, which object 24 rests on a work table 26. As shown more clearly in FIG. 2, in embodiments the lamps L are mounted in the lamp supporting housing 14 in five circular arrays or rings disposed coaxially of the axial centerline of the housings 12 and 14. The lamps L are located proximate to and typically surround the lens 30 and can create large amounts of heat in the area around the lens 30. The lens 30, which is corrected for color aberrations, is sensitive to heat. When heated, the focal length of the lens 30 changes with temperature, directly affecting the front working distance and front focus of the system, which can result in distortion of the perceived Z-axis distance.

Figure 3:
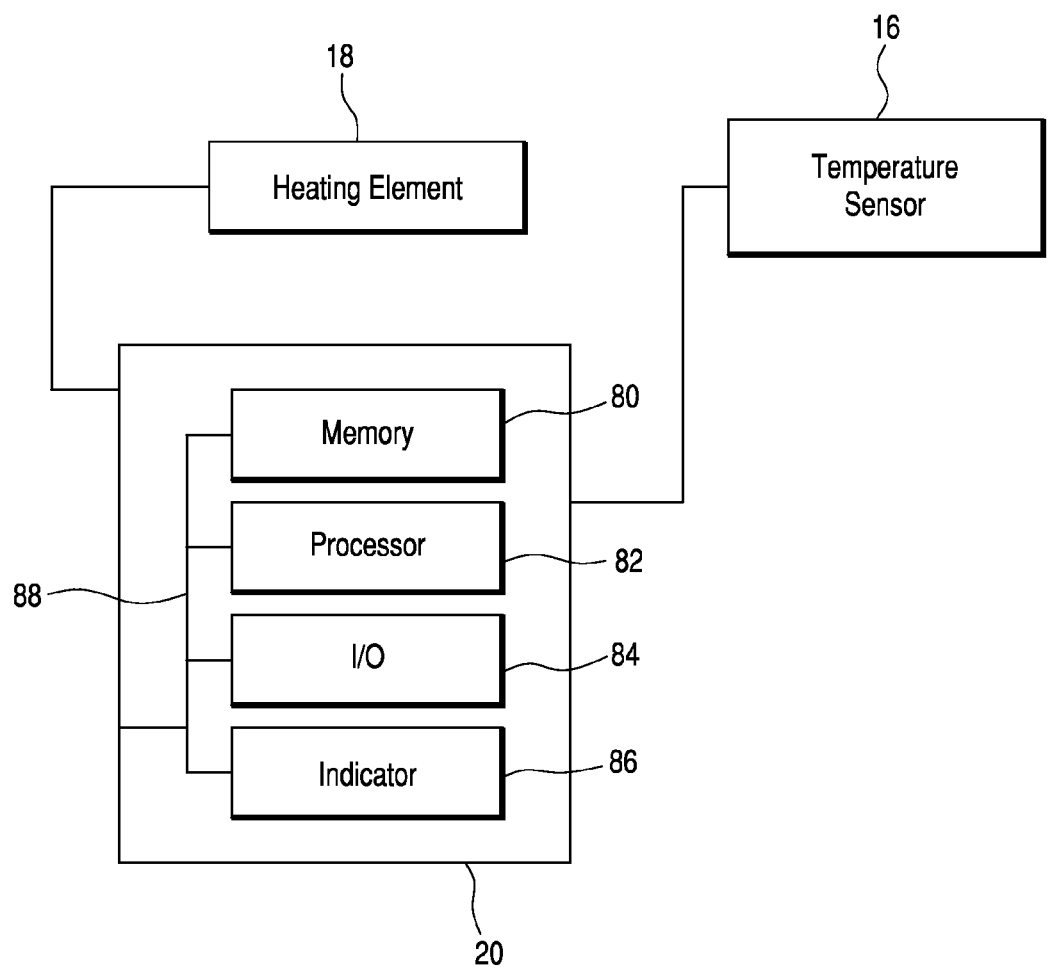
FIG. 3 is a schematic block diagram of a temperature control system for stabilizing focal length in an objective lens system in accordance with embodiments.

Referring to FIG. 3, a temperature control system preferably includes the controller 20, heating element 18, and temperature sensor 16. The controller 20 includes a memory 80, a processor 82, an input/output unit 84, and an indicator 86, which are connected together by a bus 88 or other link, although other suitable types and numbers of components in other configurations and other types of processing systems can be used for the controller 20. In alternative embodiments, all of the components are placed on a single microchip or semiconductor device. The memory 80 can store instructions and data for performing one or more aspects of embodiments, including the methods described with references to FIGS. 1-5, although some or all of these instructions and data can be stored elsewhere. A variety of different types of memory storage techniques, such as a random access memory (RAM), a read only memory (ROM), flash ROM, EEPROM, and the like, and even hard disk drives, can be used by the memory 80 to store the instructions and data.

Referring to FIGS. 1, 2 and 3, the heating element 18 comprises heat tape, preferably of the OMEGA® KAPTON type of insulated flexible heaters (catalog no. khlv 0502/5-p), although other suitable types of heating elements can be used. The heating element 18 is preferably wrapped around the circumference of the cylindrical lens housing 12 as closely as possible to the lens 30, although other locations and techniques for attaching the heating element 18 can be used. The temperature sensor 16 comprises a thermocouple, although other types of temperature sensors can be used, and is preferably mounted on the cylindrical lens housing 12 as closely as possible to the lens 30, although other locations for attaching the temperature sensor 16 can be used. The temperature sensor 16 is preferably attached with adhesive, though other attachment techniques can be used.

Referring again to FIG. 3, the controller 20 in embodiments is operatively connected to the heating element 18 and temperature sensor 16 by wire, although other techniques for connecting the devices may be used, such as wireless communications techniques. The temperature sensor 16 preferably transmits a temperature measured proximately to lens 30 or signal representative thereof to the controller 20 which, in turn, increases or decreases current to the heating element 18 as required to maintain the temperature of the lens 30 within a target temperature range in accordance with methods disclosed herein.

Figure 4:
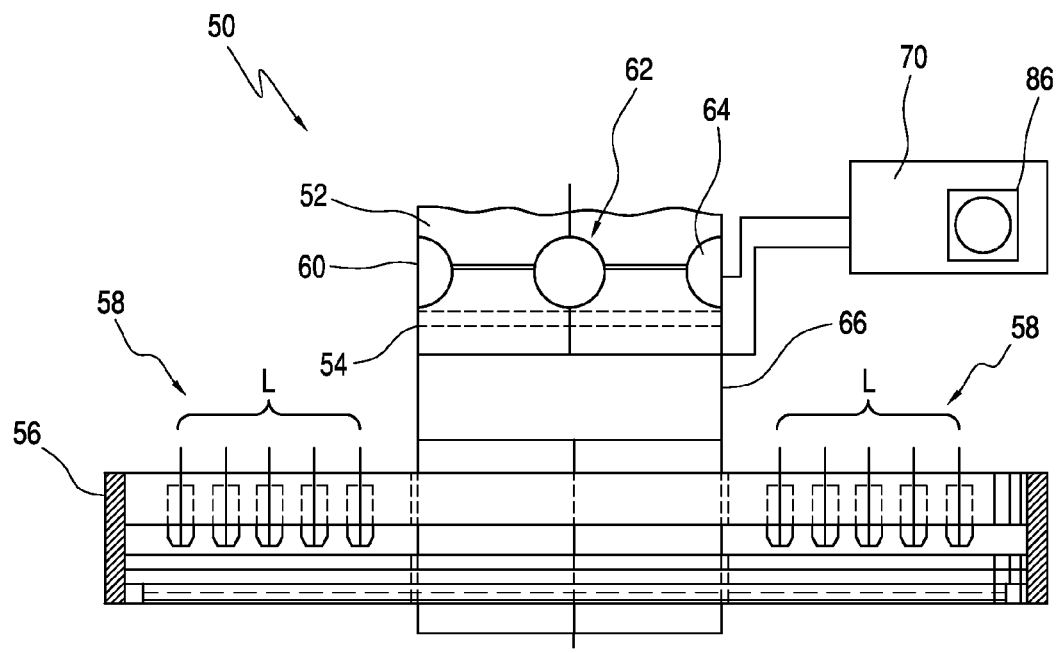
FIG. 4 is a side elevation view of an optical system having a light source coaxially mounted on one end of its objective lens system and using multiple temperature sensors, a heating element, and an indicator for active focal length stabilization in accordance with embodiments.
Figure 4:
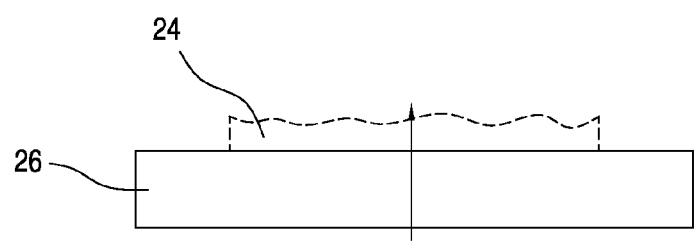

Referring to FIG. 4, other embodiments for stabilizing focal lengths in a heat sensitive lens will now be described. The system 50 of embodiments includes a cylindrical lens housing 52 containing a conventional objective lens system 54, a disc-shaped lamp supporting housing 56, a light source 58 in the lamp supporting housing 56, temperature sensors 60, 62, and 64, a heating element 66, an indicator 86, and a controller 70. In such embodiments, the controller 70 preferably calculates a weighted average temperature of the lens system 54 based on inputs from temperature sensors 60, 62, and 64, although other calculating methods can be used. The controller 70 of embodiments then adjusts current to the heating element 66 as described herein until the temperature measured at the lens system 54 by temperature sensors 60, 62, and 64 falls within the target temperature range. The entire target temperature range is preferably greater than the maximum operating temperature of the light source 58 to minimize temperature fluctuations, and hence minimize focal length-drift in the lens system 54. The indicator 86 is preferably illuminated when the temperature measured at the lens system 54 is within the target temperature range in order to advise a user that the focal length of the lens system 54 has achieved the desired stability.

Figure 5:
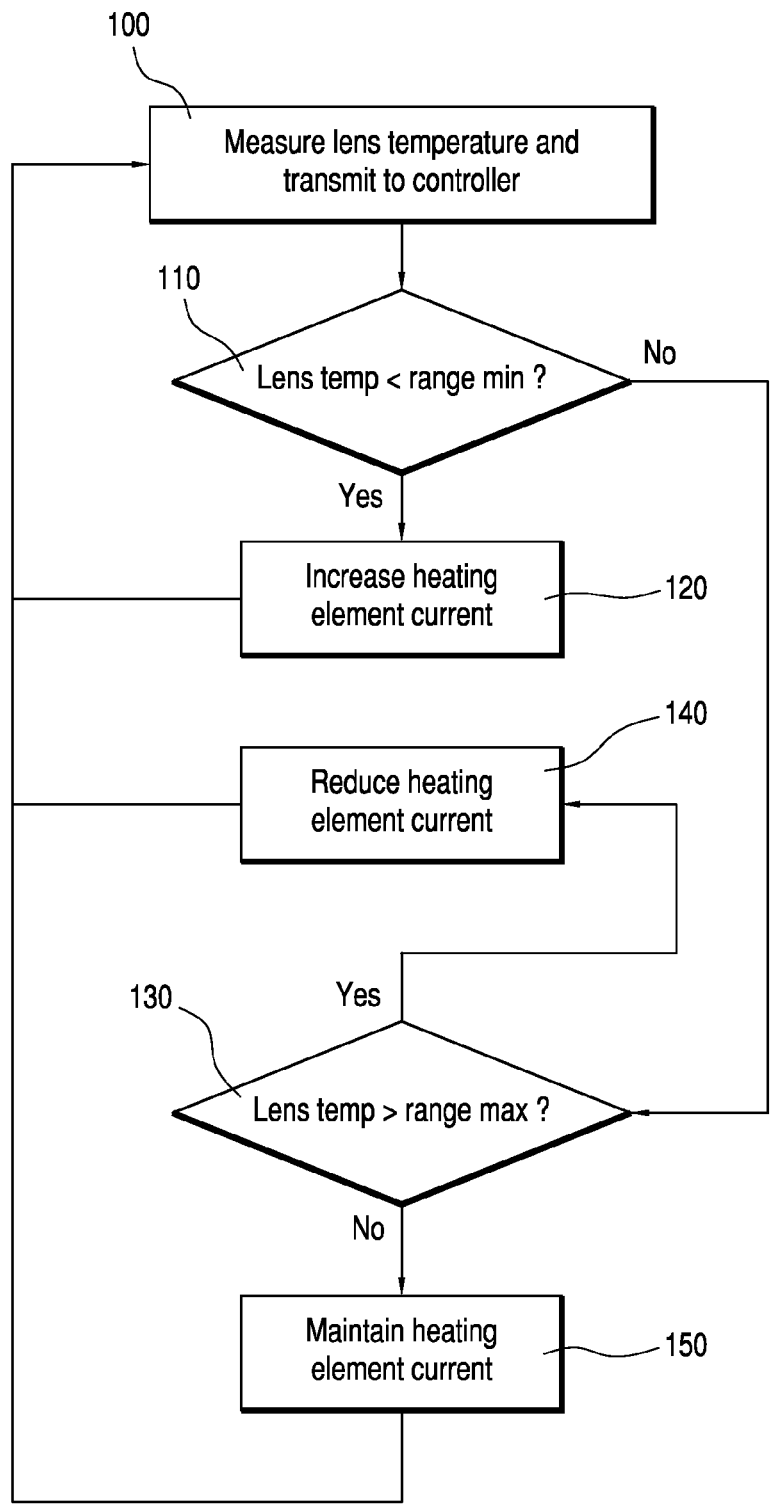
FIG. 5 is a schematic flow diagram of a method for stabilizing focal length in a heat-sensitive lens in accordance with embodiments.

Referring to FIGS. 1, 3, and 5, these figures illustrate an example of a method for stabilizing focal length in a heat-sensitive lens by heating the lens to a temperature that is greater than the maximum operating temperature of a light source surrounding the lens in accordance with embodiments. The method preferably comprises monitoring the temperature of the lens 30 using the temperature sensor 16 and maintaining the temperature of the lens 30 within a pre-selected range that is greater than the maximum operating temperature of a light source 22 surrounding the lens by controlling a heating element 18 attached to a cylindrical housing 12 surrounding the lens 30. The pre-selected range in embodiments comprises a minimum and maximum temperature that can be stored in the internal memory of the controller 20, entered into the controller 20 by a user, or provided to the controller by an external sensor such as a temperature sensor. The operating temperature range for the lens 30 will preferably be established based on the accuracy desired for the Z-axis measurements. Heating the lens 30 to the target temperature range and maintaining the lens temperature within that range will ensure the focus will remain constant whether the light source 22 has recently been turned on, remains on for a long period, or is turned off, so long as the entire range is set to be greater than the maximum operating temperature of the light source 22.

In FIG. 5, at block 100, the temperature sensor 16 of embodiments transmits a temperature measured proximately to lens 30 or signal representative thereof to the controller 20. At block 110, the controller 20 preferably compares the temperature or signal received from the sensor 16 to a pre-determined minimum temperature that is stored in the internal memory 80 of the controller 20. If the temperature received from the sensor 16 is less than the range minimum, then at block 120 the controller 20 of embodiments increases current to the heating element 18, after which the system returns to block 100. If the temperature received from the sensor 16 is greater than the range minimum, then at block 130 the controller 20 of embodiments compares the temperature received from sensor 16 to a pre-determined maximum temperature that is also stored in the internal memory 80 of the controller 20. If the temperature received from the sensor 16 is greater than the range maximum, then at block 140 the controller 20 of embodiments decreases current to the heating element 18, after which the system returns to block 100 to perform another temperature measurement. If the temperature received from the sensor 16 is less than the range maximum, then at block 150 the controller 20 of embodiments maintains the current to the heating element 18 at its present level, and the controller 20 returns to block 100 to receive another temperature measurement.

Figure 6:
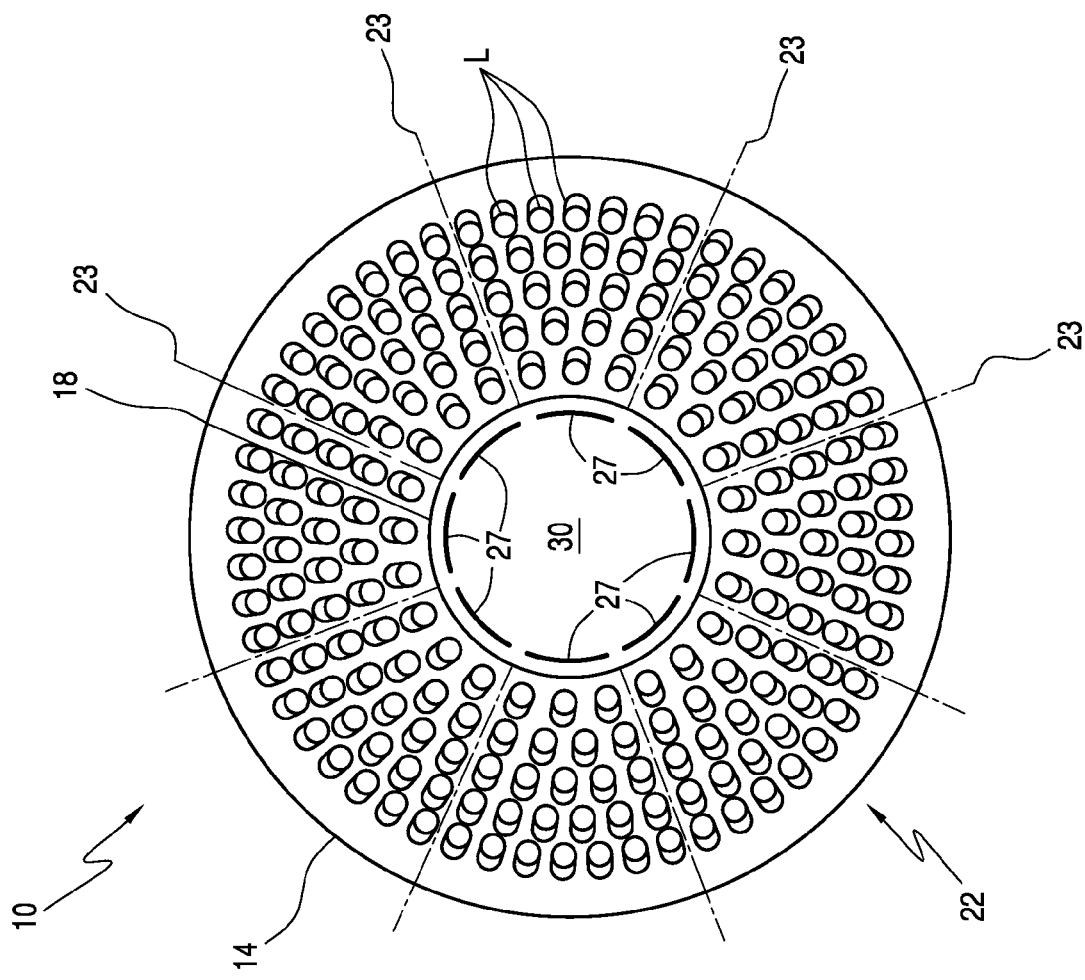
FIG. 6 is a bottom view of an optical system having a light source coaxially mounted on one end of its objective lens system in accordance with another embodiment of the invention.

In accordance with another aspect of this invention, the illuminator 22 comprises a plurality of individual light sources are arranged in segments as shown by the dotted lines 23 in FIG. 6. In some situations, for example to reduce or eliminate shadows, it is desirable to illuminate some but not all of the segments of light emitting diodes while leaving the other segments dark. This partial illumination enhances the ability to inspect the object under test but results in uneven heating of the lens and its supporting structure. In accordance with another aspect of this invention, the heater is provided that is also divided into segments preferably corresponding to the segments of the illuminator.

Figure 7:
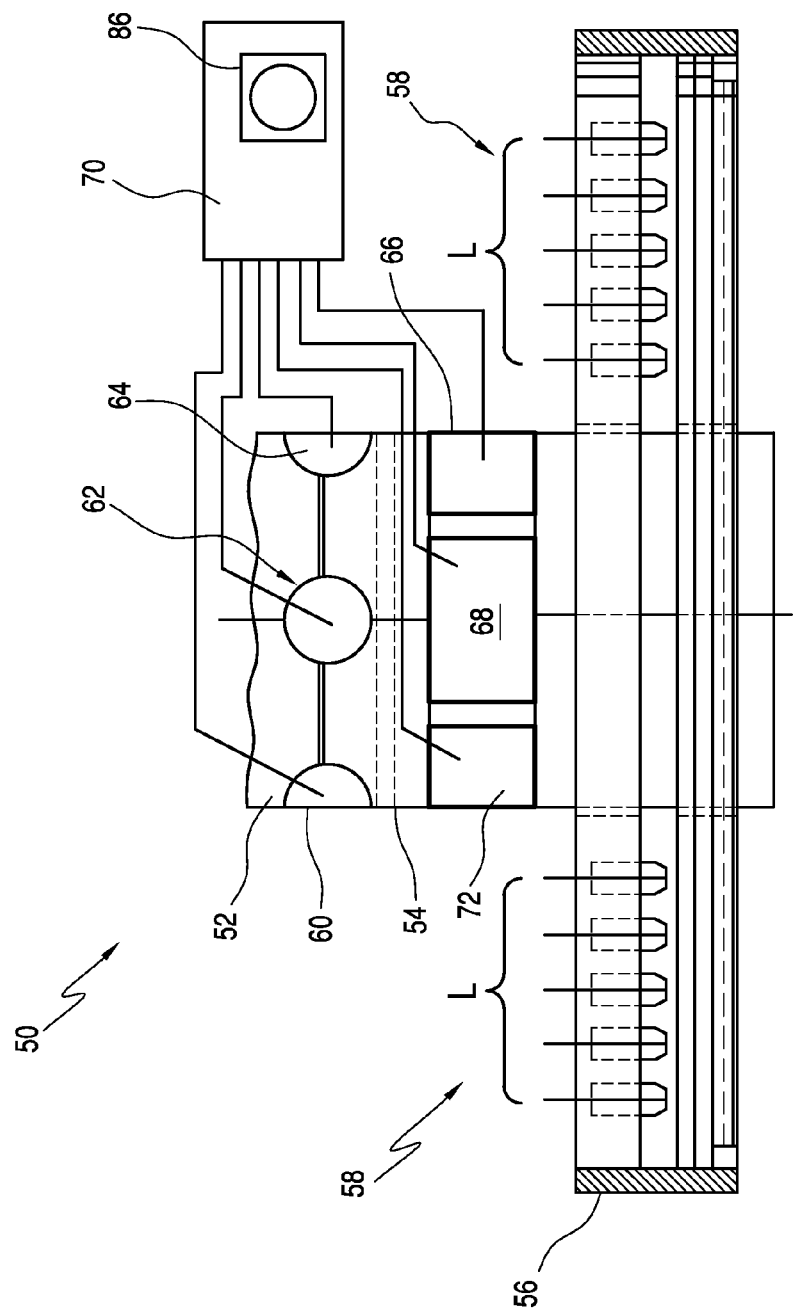
FIG. 7 is a schematic block diagram of a temperature control system for stabilizing focal length in an objective lens system in accordance with another embodiment of the invention.

As shown in FIG. 7, a control system is provided for energizing the heater segments 66, 68, 72 corresponding to the temperature sensors 64, 62, and 60 respectively of the illuminator. Only four segments are shown for simplicity, it being understood that a greater number of segments may be provided. In this way, the lens is heated relatively uniformly either by the heater or by the illuminator and various combinations of illuminated and dark segments may be employed without unevenly heating the lens and supporting structure.

The segmented heater of this embodiment of the invention may be controlled by a plurality of sensors 60, 62, 64 responsive to the temperature of a plurality of segments of the lens and/or the supporting structure to control the operation of the heaters to maintain a uniform temperature. Alternatively, in accordance with a somewhat simpler embodiment of the invention, the heating elements are designed to provide a heat output corresponding essentially to the heat output of the illuminator segments to which they correspond and a control system is provided that energizes heating element when it's corresponding illuminator segment is dark and the deenergizes the heating element when it's corresponding illuminator segment is on.

Turning for example now to FIGS. 6 and 7, four light emitting diode segments are provided each comprising two of the segments delimited by dotted lines 23 and each occupying approximately 90° of the total area of the illuminator 56, and a four sensors 60, 62, 64, and 65 (not shown) are utilized, each of the sensors can measure the temperature of a segment of the lens corresponding to a segment of the illuminator. The heating element is likewise divided into four segments, 66, 68, 72, and 73, not visible in the drawing, each segment corresponding to and generally aligned with one segment of the illuminator.

The controller 70 is connected to each of the sensors and each of the heaters and applies power to the heater segments corresponding to the dark sections of the illuminator and the sensors operate in a feedback relationship to maintain the temperature of each segment of the lens and a predetermined range.

While a variety of heating elements may be employed in connection with this invention, an arrangement in which the heating elements are resistors or other elements that generate heat when power is applied to them, arranged in the illuminator body is preferred. If resistors are employed, the value is selected so that the heat produced by the resistor is approximately the same as the heat produced by the corresponding segment of the illuminator when the LEDs are activated.

In accordance with another aspect of this invention, while a closed loop for static control system may be employed, if the heating element is selected to accurately match the heat output of the LED taking the thermal resistance of the path between the LED and the lens as well as the thermal resistance of the path between the heating element and the lens into account, a constant temperature may be employed by simply ensuring that one of but not both of the LED and heating elements is always illuminated, that is, during the time that the LEDs, or at least one of the LEDs is on, the heating element corresponding to each segment of LEDs that is not on is activated. This will ensure that a relatively constant amount of heat is coupled to the lens thereby making the temperature of the lens substantially uniform.

Figure 8:
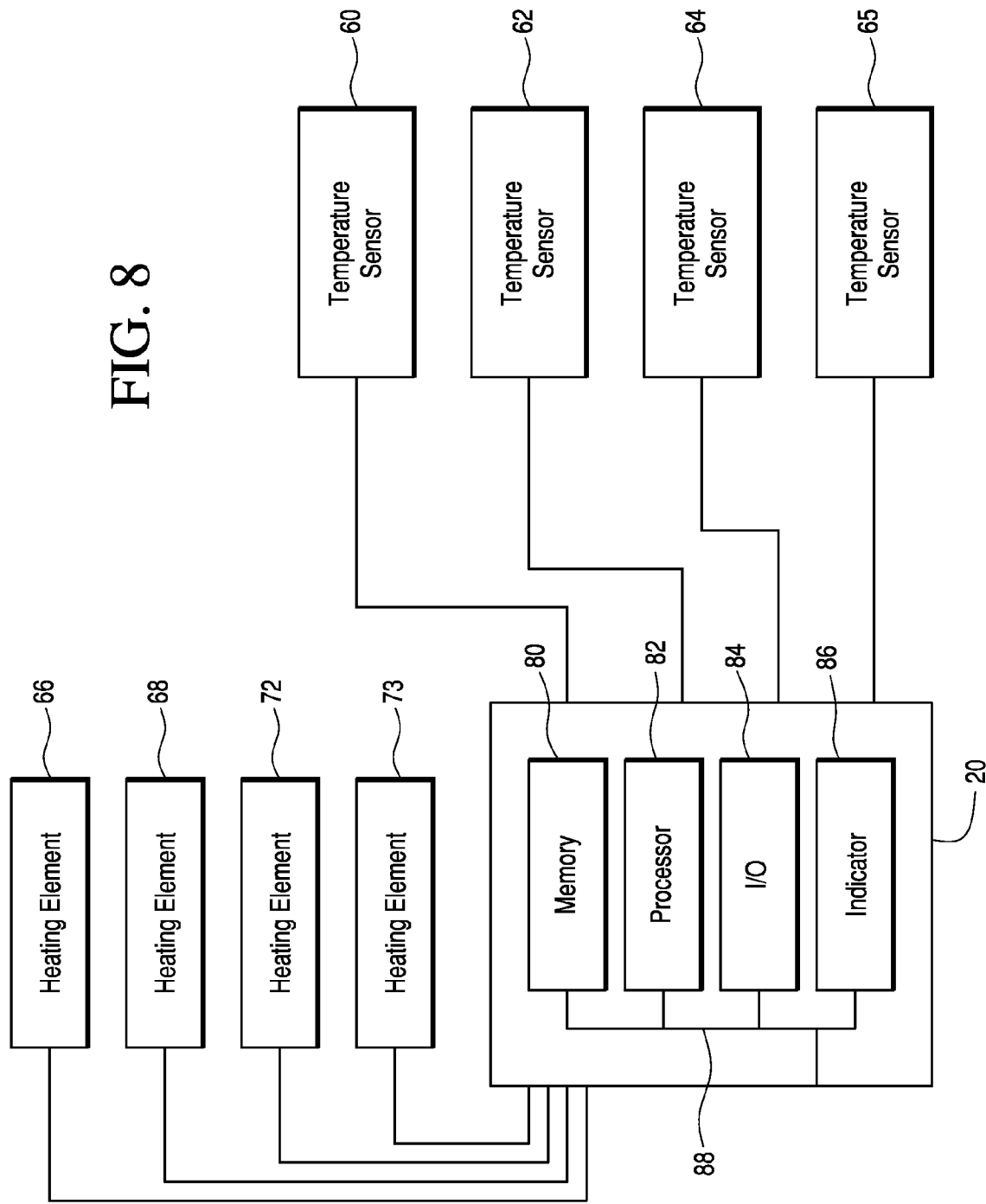
FIG. 8 is a schematic block diagram of a temperature control system for stabilizing focal length in an objective lens system in accordance with another embodiment of the invention.

Referring again to FIG. 8, the controller 20 in this embodiments is operatively connected to the heating elements 66, 68, 72 and 73 and temperature sensors 60, 62, 64, and 65 by wire, although other techniques for connecting the devices may be used, such as wireless communications techniques. The temperature sensors 60, 62, 64 and 65 preferably transmit a temperature measured proximately to lens 30 or signal representative thereof to the controller 20 which, in turn, increases or decreases current to the heating elements 66, 68, 72 and 73 as required to maintain the temperature of the lens 30 within a target temperature range in accordance with methods disclosed herein.

We have found that in addition to stabilizing the refractive index of the lens by maintaining a constant temperature, the heater of this invention also minimizes any focus effects due to expansion or contraction of the housing for the lens because of uneven heating.

While particular embodiments have been described, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefore, is not intended to limit the claimed processes to any order except as may be specified in the claims.

What is claimed is:

1. An optical system having focal length stabilization, the system comprising:
    a heat sensitive lens;
    a plurality of light sources thermally coupled to the lens and each of the light sources heating a different portion of the lens when each light source is on;
    a plurality of heating elements each thermally coupled to one of the different portions of the lens; at least one temperature sensor thermally coupled to one of the different portions of the lens for sensing the temperature of the lens either directly or indirectly; and
    a controller communicating with the at least one temperature sensor and at least one of the plurality of heating elements, the controller adjusting the heating element to maintain the lens temperature in said one of the different portions within a preselected range.

2. The optical system of claim 1 in which the lens temperature is greater than a reference temperature.

3. The system of claim 2 in which the lens temperature is greater than a maximum temperature to which the plurality of light sources alone heat the lens.

4. The system of claim 1 in which the controller maintains the lens temperature in each of the different portions of the lens a substantially constant value that is greater than a maximum temperature to which the plurality of light sources would heat the lens whereby changes in a front focal length of the lens caused by temperature variation are minimized.

5. The system of claim 4 further comprising an indicator that is actuated when the lens temperature exceeds the maximum temperature to which the plurality of light sources would otherwise heat the lens.

6. The system of claim 1 in which the lens is disposed within a housing and the plurality of light sources surrounds a lower end of the housing.

7. The system of claim 6 in which the light plurality of light sources comprise an annular lamp housing containing a plurality of radically spaced generally circular arrays of lamps.

8. The system of claim 7 wherein the lamps are light-emitting diodes.

9. The system of claim 1 in which the temperature sensor is a thermocouple.

10. The system of claim 1 in which the preselected range is programmed into the controller.

11. A heat sensitive lens focal length stabilization method in which a lens is supported in thermal proximity to a plurality of light sources each light source capable of heating one portion of the lens comprising the steps of:
    monitoring the temperature of at least one portion of the lens using a temperature sensor;
    determining a preselected temperature range; and
    maintaining the lens temperature in the at least one portion within the preselected range by controlling a heating element thermally coupled to the at least one portion of the lens.

12. The method of claim 11 wherein determining a preselected range comprises determining a preselected range that is greater than a reference temperature.

13. The method of claim 11 in which determining a preselected range comprises determining a preselected range that is greater than a maximum temperature to which the each light source of the plurality of light sources would otherwise heat the at least one portion of the lens.

14. The method of claim 13 in which maintaining the lens temperature comprises adjusting power to the heating element to maintain the lens temperature of the at least one portion at a temperature greater than a maximum temperature to which the each light source of the plurality of light sources could otherwise heat the at least one portion of the lens, thereby minimizing changes in a front focal length of the lens caused by temperature variation.

15. The method of claim 11 comprising monitoring the temperature of a plurality of portions of the lens using a plurality of temperature sensors.

16. The method of claim 11 in which the step of maintaining the lens temperature comprises maintaining the temperature within the preselected range by controlling a plurality of heating elements thermally coupled to respective portions of the lens.

17. An optical system having focal length stabilization, the system comprising:
    a heat sensitive lens;
    a plurality of light sources each thermally coupled to the lens and heating different portions of the lens when each light source is on;
    a plurality of heating elements each one corresponding to one of the plurality of light sources and thermally coupled to a corresponding one of said different portions of the lens; and
    a controller communicating with each of the plurality of light sources and each of the plurality of heating elements, the controller activating each one of the heating elements when the corresponding light source is off, to maintain the lens temperature within a preselected range.

* * * * *